(12) United States Patent
Xia et al.

(10) Patent No.: US 9,002,194 B2
(45) Date of Patent: Apr. 7, 2015

(54) OPTICAL-LAYER MULTIPATH PROTECTION FOR OPTICAL NETWORK

(75) Inventors: Ming Xia, Milpitas, CA (US); Stefan Dahlfort, Santa Clara, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 217 days.

(21) Appl. No.: 13/542,310

(22) Filed: Jul. 5, 2012

(65) Prior Publication Data

US 2013/0266305 A1 Oct. 10, 2013

Related U.S. Application Data

(60) Provisional application No. 61/621,888, filed on Apr. 9, 2012.

(51) Int. Cl.
*H04B 10/00* (2013.01)
*H04J 14/02* (2006.01)

(52) U.S. Cl.
CPC .................................. *H04J 14/0298* (2013.01)

(58) Field of Classification Search
CPC ... H04Q 11/00–11/026; H04J 14/02–14/0271; H04B 10/03–10/0799
See application file for complete search history.

(56) References Cited

U.S. PATENT DOCUMENTS

| | | |
|---|---|---|
| 4,809,362 A | 2/1989 | Claus et al. |
| 5,301,053 A | 4/1994 | Shikada |
| 6,067,288 A | 5/2000 | Miller et al. |
| 6,493,117 B1 | 12/2002 | Milton et al. |
| 6,567,429 B1 | 5/2003 | DeMartino |
| 6,633,695 B2 | 10/2003 | Bailey et al. |
| 6,687,463 B1 | 2/2004 | Hutchison et al. |
| 6,754,403 B1 | 6/2004 | Schmid |
| 7,024,116 B2 | 4/2006 | Orbach et al. |
| 7,181,095 B1 | 2/2007 | Meli et al. |
| 7,200,331 B2 | 4/2007 | Roorda et al. |
| 7,483,636 B2 | 1/2009 | Aoki et al. |
| 7,546,043 B2 | 6/2009 | Kai et al. |

(Continued)

FOREIGN PATENT DOCUMENTS

| | | |
|---|---|---|
| EP | 1703762 A2 | 9/2006 |
| WO | WO 00/76105 A1 | 12/2000 |

(Continued)

OTHER PUBLICATIONS

ITU-T G.707/Y.1322 (Jan. 2007), "Network node interface for the synchronous digital hierarchy (SDH)", Jan. 2007, the whole document.

(Continued)

*Primary Examiner* — Li Liu

(57) ABSTRACT

A multi-path provisioning scheme is provided to ensure full protection while reducing or minimizing resource overbuild. A signal to be provisioned is divided at a source node into a plurality of sub-signals that are independently routed from the source node to a destination node. Bandwidth for back-up traffic B is allocated in addition to bandwidth for primary traffic T. In some embodiments, the initial bandwidth B of the backup traffic equals the bandwidth of the primary traffic. The T+B traffic is initially distributed so that no link carries more than B traffic. The traffic distribution pattern is then iteratively revised to reduce the bandwidth requirements for the backup traffic while still meeting requirements for protection.

13 Claims, 9 Drawing Sheets

(56) References Cited

U.S. PATENT DOCUMENTS

| | | | |
|---|---|---|---|
| 7,599,620 | B2 | 10/2009 | Graves et al. |
| 7,657,181 | B2 | 2/2010 | Terai et al. |
| 7,860,396 | B2 | 12/2010 | Claringburn et al. |
| 8,521,024 | B2 | 8/2013 | Wellbrock et al. |
| 8,693,880 | B2 | 4/2014 | Sakauchi et al. |
| 2001/0046350 | A1 | 11/2001 | Tedesco |
| 2001/0051019 | A1 | 12/2001 | Bailey et al. |
| 2002/0191250 | A1 | 12/2002 | Graves et al. |
| 2004/0141746 | A1 | 7/2004 | Oberg |
| 2004/0153492 | A1* | 8/2004 | Cao et al. ............... 709/200 |
| 2004/0197099 | A1 | 10/2004 | Kai et al. |
| 2004/0212897 | A1 | 10/2004 | Tedesco |
| 2005/0084262 | A1 | 4/2005 | Oberg et al. |
| 2005/0259571 | A1 | 11/2005 | Battou |
| 2005/0275921 | A1 | 12/2005 | Haus et al. |
| 2006/0110162 | A1 | 5/2006 | Tian et al. |
| 2006/0275034 | A9 | 12/2006 | Way et al. |
| 2007/0212068 | A1 | 9/2007 | Miyazaki et al. |
| 2008/0013950 | A1 | 1/2008 | Boudreault et al. |
| 2008/0044184 | A1 | 2/2008 | Popovic |
| 2008/0317466 | A1 | 12/2008 | Chung et al. |
| 2009/0047019 | A1 | 2/2009 | Palacharla et al. |
| 2009/0220228 | A1 | 9/2009 | Popovic |
| 2010/0014859 | A1* | 1/2010 | D'Alessandro et al. ........ 398/48 |
| 2010/0209038 | A1 | 8/2010 | Popovic et al. |
| 2011/0135305 | A1 | 6/2011 | Barnard |
| 2011/0236021 | A1 | 9/2011 | Presi et al. |
| 2011/0274425 | A1 | 11/2011 | Grobe |
| 2012/0183294 | A1 | 7/2012 | Boertjes et al. |
| 2012/0201541 | A1 | 8/2012 | Patel et al. |
| 2012/0251117 | A1 | 10/2012 | Patel et al. |
| 2013/0243416 | A1 | 9/2013 | Dahlfort et al. |
| 2013/0336653 | A1 | 12/2013 | Öhlén |
| 2014/0023372 | A1 | 1/2014 | Sambo et al. |

FOREIGN PATENT DOCUMENTS

| | | |
|---|---|---|
| WO | WO 2007048650 A1 | 5/2007 |
| WO | WO 2010/025767 A1 | 3/2010 |
| WO | WO 2012/025148 A1 | 3/2012 |

OTHER PUBLICATIONS

ITU-T G.7042/Y.1305 (Mar. 2006), "Link capacity adjustment scheme (LCAS) for virtual concatenated signals", Mar. 2006, the whole document.

Acharya S. et al. "PESO: Low Overhead Protection for Ethernet over SONET Transport", INFOCOM 2004, the whole document.

Dahlfort S. et al. "Split Spectrum Approach to Elastic Optical Networking", ECOC 2012, the whole document.

Strasser T.A. et al. "Wavelength-Selective Switches for ROADM Applications", IEEE Journal of Selected Topics in Quantum Electronics, V. 16, N. 5, Sep./Oct. 2010, the whole document.

Jinno M., et al., "Spectrum-Efficient and Scalable Elastic Optical Path Network: Architecture, Benefits, and Enabling Technologies", IEEE Comm. Mag.,47(11), Nov. 2009, the whole document.

Gringeri ST. et al., "Technical Considerations for Supporting Data Rates Beyond 100 Gb/s", IEEE Comm. Mag., Feb. 2012, the whole document.

Thiagarajan S. et al. "Spectrum efficient super-channels in dynamic flexible grid networks—a blocking analysis", OSA/OFC/NFOEC,2011, the whole document.

Patel A.N. et al., "Routing, Wavelength Assignment, and Spectrum Allocation in Wavelength-Convertible Flexible Optical WDM (WC-FWDM) Networks", Optical Fiber Communication Conference and Exposition (OFC/NFOEC), 2012, and the National Fiber Optic Engineers Conference, IEEE, Mar. 4, 2012, the whole document.

Patel A.N. et al., "Routing, Wavelength Assignment, and Spectrum Allocation Algorithms in Transparent Flexible Optical WDM Networks", Optical Switching and Networking, Elsevier, NL, Feb. 7, 2012, the whole document.

Li Y. et al., "Flexible Grid Label Format in Wavelength Switched Optical Network draft-li-ccamp-flexible-grid-label-00", Network Working Group, Internet Draft, Jul. 4, 2011, the whole document.

Shen et al: "From Coarse Grid to Mini-Grid to Gridless: How Much can Gridless Help Contentionless", OFC 2011, Mar. 6-10, 2011, paper OTuptu3, pp. 1-3.

\* cited by examiner

OPTICAL-LAYER MULTIPATH PROTECTION FOR OPTICAL NETWORK

PRIORITY CLAIM

This application claims the benefits under 35 U.S.C. §119 (e) of U.S. Provisional Patent Application 61/621,888 filed 9 Apr. 2012, which is incorporated herein by reference.

TECHNICAL FIELD

The present invention relates generally to optical networking and, more particularly, to optical-layer multipath protection in an optical network.

BACKGROUND

The development of optical switching equipment along with the use of dense wavelength division multiplexing (DWDM) has led many service providers to replace optical ring networks based on SONET (Synchronous Optical Networking) and SDH (Synchronous Digital Hierarchy) protocols with optical mesh networks. The large bandwidth capacity of optical networks makes them ideal for high speed data applications and the use of DWDM allows aggregation of many channels onto a single fiber. Consequently, a single failure within the network can result in a large amount of data loss and may impact many users. Because operators typically provide guaranteed quality of service (QoS) requirements in service level agreements, the resilience of the optical network is becoming increasingly important to network operators.

Resilience in an optical network can be achieved by adding protection resources to carry back-up traffic in addition to resources for the primary traffic. Such protection schemes may be generally categorized as single-path protection schemes and multi-path protection schemes.

In single-path protection schemes, the primary traffic is routed over a single path from a source node to a destination node, and back-up traffic is routed over a different path. The back-up path should not share any links with the primary path. For complete protection, commonly referred to as 1+1 protection, the amount of resources allocated for the back-up traffic should be equal to the resources allocated for the primary traffic. Consequently, single-path protection providing 1+1 protection results in a 100% resource overbuild.

Multi-path protection schemes provide an attractive alternative to single-path protection schemes. In multi-path protection schemes, the primary traffic is routed over multiple paths from the source node to the destination node, and a single back-up path can provide protection for multiple primary paths. For example, if the primary traffic is equally split between two link-disjoint paths, 100% protection against a single failure can be provided by a single back-up path capable of handling 50% of the primary traffic. Multi-path protection has some advantages over single-path protection. These advantages include: 1) less constraint on bandwidth availability; 2) lower resource overbuild than single-path protection; 3) increased reliability; and 4) less constraint on transmission impairment.

Multi-path provisioning and protection is enabled by Virtual Concatenation (VCAT) and Link Capacity Adjustment Scheme (LCAS) in SONET/SDH networks. VCAT is an inverse multiplexing technique that groups an arbitrary number of SONET/SDH containers to create a larger container, thus providing flexible and efficient bandwidth allocation. Network operators can combine any number of low-order or high-order containers depending on the switching granularity to create a VCAT group. A connection carried by a VCAT group can be split into multiple paths at the source node and merged at the destination node as each group member is routed independently. The capacity of a VCAT group can be dynamically and hitlessly changed, i.e., increased and decreased, by the LCAS protocol. LCAS also provides survivability capabilities by automatically decreasing the capacity if a member of the VCAT group experiences a failure in the network, and increasing the capacity when the network fault is repaired.

Because VCAT/LCAS offers multi-path protection in the SONET/SDH layer, it requires all nodes to be configured to implement SONET/SDH protocols. Further, intermediate processing requires digital processing, which results in a high processing cost, high power consumption per unit traffic, and complex control and management algorithms. Another drawback is that VCAT/LCAS requires granular traffic in small containers so that traffic can be merged and split flexibly at intermediate nodes.

Optical provisioning and protection may also be provided in the optical layer. Multi-path provisioning in the optical layer has some advantages over multi-path provisioning at the SONET/SDH layer. Multi-path provisioning at the optical layer requires fewer processing resources and lower signaling overhead. Further, multi-path provisioning at the optical layer does not require granular traffic so there is more flexibility in allocating resources. However, multi-path provisioning in the optical layer, e.g., Split Spectrum, sets up wavelength/spectrum channels that physically bind bandwidth to each sub-signal. These sub-signals cannot be split at intermediate nodes. This property is referred to as the integrality of sub-signals. Thus, protection schemes for multi-path protection in the optical layer must be realized on a sub-signal basis.

SUMMARY

The present disclosure relates to techniques for multi-path provisioning to ensure full protection while reducing or minimizing resource overbuild. In exemplary embodiments described in the present disclosure, a signal is divided at a source node into a plurality of sub-signals that are independently routed from the source node to a destination node. Bandwidth B for back-up traffic is allocated in addition to bandwidth T for primary traffic. In some embodiments, the initial bandwidth B of the backup traffic equals the bandwidth T of the primary traffic. The T+B traffic is initially distributed so that no link carries more than B traffic. The traffic distribution pattern is then iteratively revised to reduce the bandwidth requirements for the backup traffic while still meeting requirements for protection.

Exemplary embodiments of the invention comprise a method for determining a traffic distribution pattern in an optical network comprising multiple links connecting a source node to a destination node. A signal is divided into multiple sub-signals at the source node. Each sub-signal may comprise primary traffic, backup traffic, or a combination of primary and backup traffic. A traffic distribution pattern is determined such that each signal traverses one or more links between the source node and destination node. The traffic distribution pattern is then iteratively revised to reduce the bandwidth allocated for the backup traffic. In each iteration, one or more critical links in the distribution pattern and the sub-signals carried by the critical link(s) are identified. Primary traffic is reallocated from the sub-signals traversing the critical link(s) to one or more link-disjoint sub-signals. Backup traffic on the link-disjoint sub-signals is then reduced. This process is repeated until no further reductions in the backup traffic are possible or until some predetermined criterion is satisfied.

Other embodiments of the invention comprise a system module for an optical network. The system module comprises an optical module to transmit and receive signals over the optical network, and a processing module to determine the traffic distribution pattern for transmitted signals. The processing module is configured to divide a transmitted signal into a plurality of sub-signals. Each sub-signal may comprise primary traffic, backup traffic, or a combination of primary and backup traffic. The processing module is further configured to determine a traffic distribution pattern such that each signal traverses one or more links between the source node and the destination node. The processing module is further configured to iteratively revise the traffic distribution pattern to reduce the bandwidth allocated to the backup traffic. In each iteration, the processing module identifies one or more critical links in the distribution pattern and the sub-signals carried by the critical links. The processing module reallocates the primary traffic from the sub-signals traversing the critical link to one or more link-disjoint sub-signals, and reduces the backup traffic on the link-disjoint sub-signals. This process is repeated until no further reductions in the backup traffic are possible or until some predetermined criterion is satisfied.

The multi-path provisioning approach described in this disclosure does not require link-disjoint routing or granular traffic, and complies with sub-signal integrality. The iterative approach to multi-path provisioning is more computationally efficient than other approaches and reduces resource overbuild while still meeting requirements for protection.

DETAILED DESCRIPTION

Embodiments disclosed herein provide a resilient multi-path provisioning scheme for split-spectrum optical networks. Split-spectrum is a new approach to elastic optical networking. In split-spectrum optical networks, traffic may be split at a source node into multiple sub-signals by a traffic distributor. All sub-signals of the same original traffic are designated as a splitting group (SG). By splitting traffic, non-contiguous spectrum fragments can be more efficiently utilized to accommodate the small spectrum demands of the sub-signals, and the constraint of transmission over long distances can be relaxed.

Split-spectrum optical networks enable resilient multi-path provisioning at the optical layer with optical by-pass and protocol transparency at intermediate nodes. The traffic distributor at the source node determines a bandwidth distribution pattern for resilience purposes. A distribution pattern specifies the amounts of primary and back-up traffic on each sub-signal under a specific network state. A network state corresponds to one or multiple failure cases, and is changed at each failure occurrence. Upon occurrence of a failure, the network state changes and triggers the traffic distributor to switch to a different distribution pattern, which reallocates traffic among the unaffected sub-signals.

After traffic is split and goes through digital-to-analog (D/A) conversion, it is modulated onto multiple sub-signals by a laser array. Sub-signals optically by-pass intermediate nodes before reaching the destination node. This by-pass feature avoids expensive and power-intensive optical-electrical-optical (OEO) conversion and electronic processing at the intermediate nodes.

Figure 1:
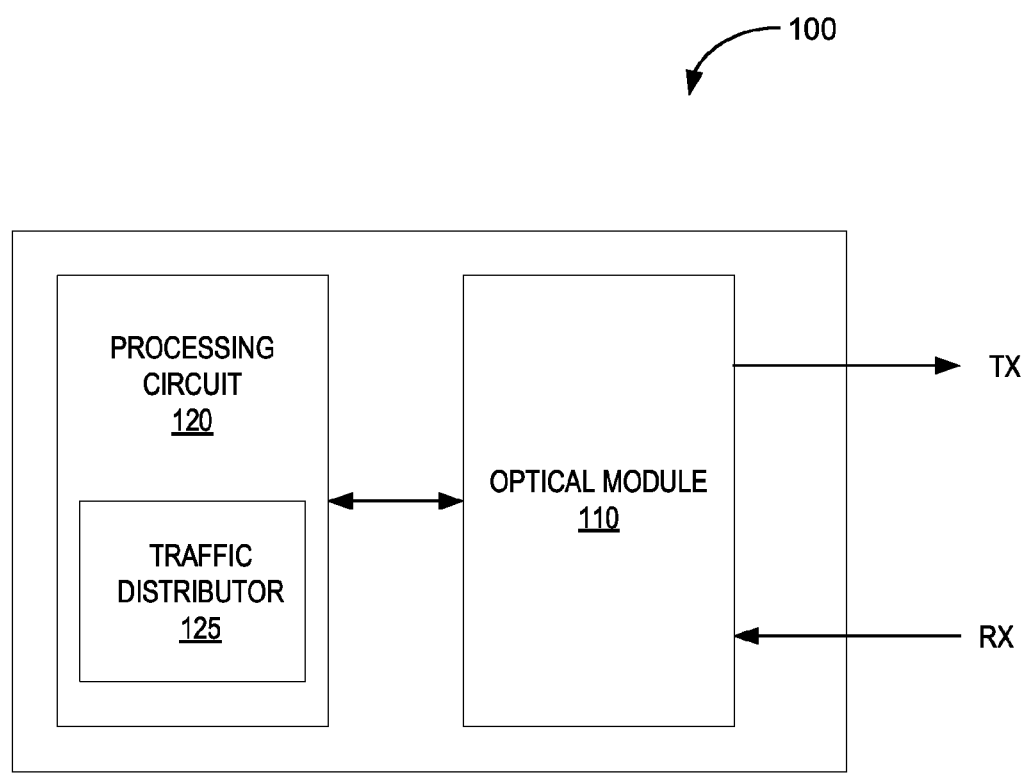
FIG. 1 illustrates a system module for an optical network node implementing multi-path provisioning as herein described.

FIG. 1 illustrates a sub-module 100 for a node in an optical mesh network. The sub-module 100 may comprise a component of an edge router or reconfigurable optical add/drop multiplexer (ROADM). The sub-module 100 includes an optical module 110 and processing circuit 120. The optical module 110 provides an optical interface to the optical network. The optical module 110 includes a modulator array for modulating data onto an optical carrier, and a receiver array for demodulating data in a received optical signal. The processing circuit 120 processes signals transmitted and received by the optical module 110. The processing module 120 includes a traffic distributor 125 which can split traffic into two or more sub-signals for routing among multiple paths.

Figure 2:
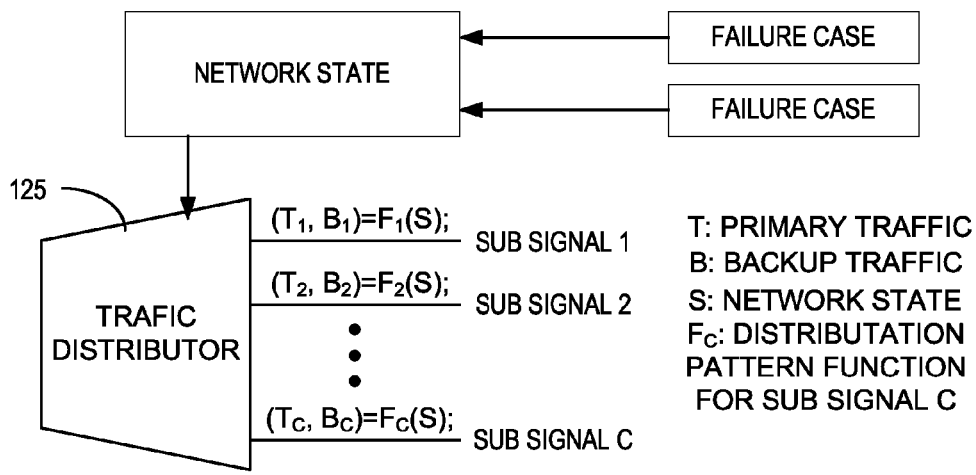
FIG. 2 illustrates a traffic distributor for the system module according to one exemplary embodiment.

FIG. 2 illustrates operation of the traffic distributor 125. As shown in FIG. 2, a network state is defined for each failure condition or a combination of failure conditions. Traffic distribution patterns are one-to-one mapped to the network states. When a failure occurs, a new network state is determined and is input to the traffic distributor 125. Based on the network state, the traffic distributor 125 determines a corresponding distribution pattern and splits the primary and back-up traffic accordingly.

Upon occurrence of a failure, a node downstream of the failure propagates the failure IDs in the control plane to all other nodes in the network. Upon receiving the failure IDs, the processing circuit 120 in the source node determines the resulting network state and blocks the lasers for the affected paths. The source node generates a new distribution pattern for each SG. A flag header is inserted in each sub-signal of an SG to indicate the start of the new distribution pattern. The flag can be implemented using Operations, Administration and Maintenance (OAM) fields of existing protocols or via out-of-band control plane signaling. By detecting the flag header, the destination node of an SG identifies the new distribution pattern and reconfigures the receiver.

To achieve full recovery for a given bandwidth T for primary traffic, the optimal multipath solution is allocating $T/(K-1)$ traffic, either primary or back-up, evenly over a maximum of K link-disjoint paths. This solution achieves the minimum resource overbuild of $T/(K-1)$. However, not every routing path may be able to load $T/(K-1)$ traffic due to bandwidth availability. Further, the network topology may prohibit a large K.

In the embodiments disclosed herein, bandwidth B for back-up traffic is allocated in addition to bandwidth T for primary traffic. The T+B traffic is distributed so that no link carries more than B traffic. This provisioning scheme does not require link-disjoint routing. Further, the value of B can be adjusted based on bandwidth constraints on each link to provide flexibility in provisioning and greater routing feasibility.

The selected value of B represents a trade-off between bandwidth efficiency and routing feasibility. A small B value results in a low resource over-build but limits the bandwidth that can be used on each link. Also, due to sub-signal integrality, the sub-signal rate has to be less than B. Consequently, a small B value produces a large number of sub-signals which increases the complexity of provisioning. In VCAT, B is searched from Synchronous Transport Signal level 1 (STS-1) to the smallest STS-nc that can accommodate B. This approach limits B to discrete values but facilitates fast computation. In split-spectrum optical networks, B can be assigned flexibly to exploit more for bandwidth allocation; but, testing each possible value of B would incur higher computation costs.

In exemplary embodiments, an iterative approach is used to determine the traffic distribution patterns for each network state. The iterative approach simultaneously addresses routing feasibility, resource efficiency, and computation efficiency. To begin, a large value of B is selected for a feasible provisioning. The bandwidth allocation is then iteratively adjusted to reduce resource overbuild. The iterative provisioning approach has several advantages. First, the approach does not require link-disjoint routing. Also, it complies with sub-signal integrality and does not require granular traffic.

In one exemplary embodiment, the traffic distribution pattern is determined as follows:

1) select a value of B (e.g., B+T);
2) split T+B traffic into N sub-signals respecting transmission constraints;
3) route the N sub-signals over the network individually, with each link carrying total traffic no more than B or its actual free bandwidth, whichever is smaller;
4) identify the most loaded links for the SG and mark them as critical links;
5) find the sub-signal $S_m$ in SG that traverses the most critical links, or for sub-signals that traverse equal numbers of critical links, choose the one that traverses the second most loaded link for the SG);
6) determine if a disjoint group (DG) exists in SG and determine all $S_n$ in the DG which are link-disjoint from $S_m$;
7) shift P primary traffic from $S_m$ to any $S_n$ in DG (P may be computed as the difference between the traffic carried by the critical link and the second loaded link that is disjoint from $S_m$);
8) reduce B traffic on $S_n$ while guaranteeing a full recovery for a single failure scenario; and
9) repeat steps 4-8 until no traffic redistribution can be done or until some predetermined criterion is satisfied (e.g., until a predetermined number of iterations have been completed).

Figure 3:
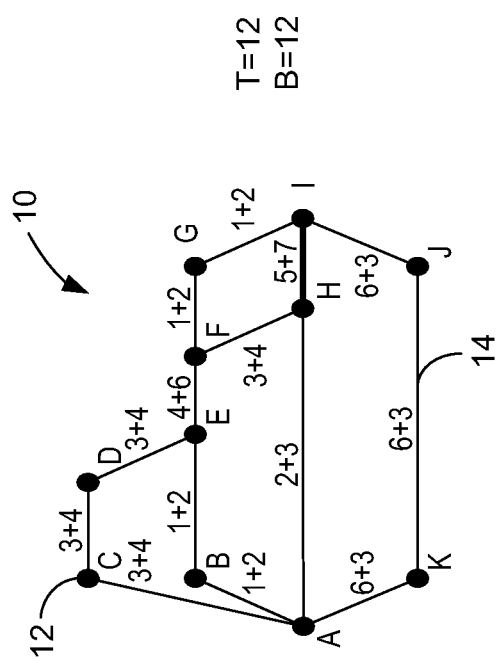
FIGS. 3-7 illustrate an example of multi-path provisioning according to one exemplary embodiment.

FIGS. 3-8 illustrate one example of the method applied to determine a traffic distribution pattern in a network 10 to reduce resource overbuild. The network 10 includes a plurality of nodes 12, which are individually denoted as nodes A, B, C, D, E, F, G, H, I, J and K. The nodes 12 are connected by links 14 on which traffic is carried between the nodes 12. Assume that there are T=12 units of primary traffic to be provisioned, and that B=T. The traffic is split into 4 sub-signals in step 2 and initially distributed in step 3 as shown in FIG. 3. The traffic on each link 14 is denoted x+y, where x is the primary traffic and y is the backup traffic. The routing paths for the four sub-signals are given in Table 1 below:

TABLE 1

| Sub-signal | Routing path |
| --- | --- |
| 1 | A-C-D-E-F-H-I |
| 2 | A-B-E-F-G-I |
| 3 | A-H-I |
| 4 | A-K-J-I |

As seen in FIG. 3, the link H-I (shown as bold) carries 12 units of traffic and is identified as the critical link in step 4. In step 5 sub-signal 1 is selected to shift its primary traffic to a link-disjoint sub-signal. In steps 6 and 7, sub-signal 4 is identified as being the only link-disjoint sub-signal and is selected to receive the primary traffic shifted from sub-signal 1. In step 7, P=3 units of primary traffic are shifted from sub-signal 1 to sub-signal 4. In this example, link K-J is identified as the most heavily loaded link associated with a link-disjoint sub-signal and is selected as a reference link for computing the amount P of primary traffic to reallocate. P is computed as the difference between the total traffic on the critical link H-I (12 units) and the total traffic on the reference link.

Figure 4:
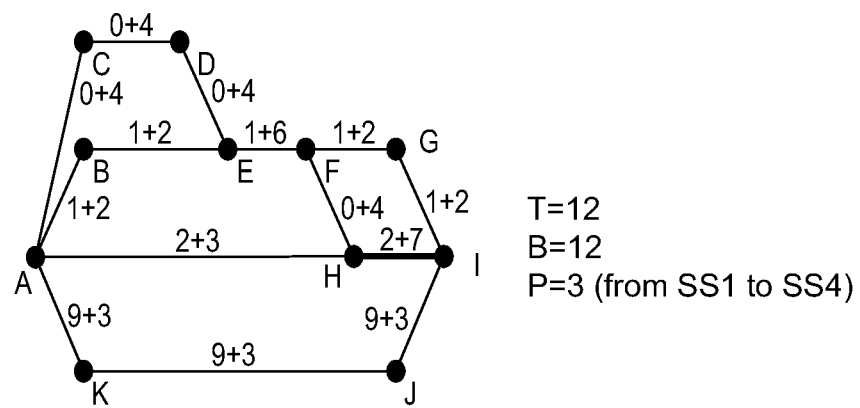

The traffic distribution pattern after shifting the primary traffic is shown in FIG. 4. As seen in FIG. 4, 3 additional units of primary traffic are added to each link in sub-signal 4 and 3 units of traffic are subtracted from each link in sub-signal 1. In step 8, the backup traffic on sub-signal 4 is reduced by 3 traffic units, which still ensures a full recovery from a single failure.

Figure 5:
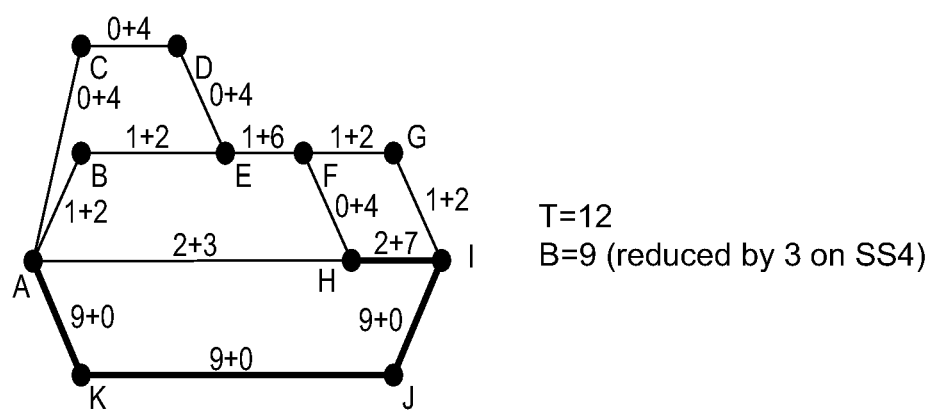

The traffic distribution pattern after reducing the backup traffic is shown in FIG. 5. In situations where there are more than one link-disjoint sub-signal, backup traffic can be shifted to any combination of the link-disjoint paths.

Figure 6:
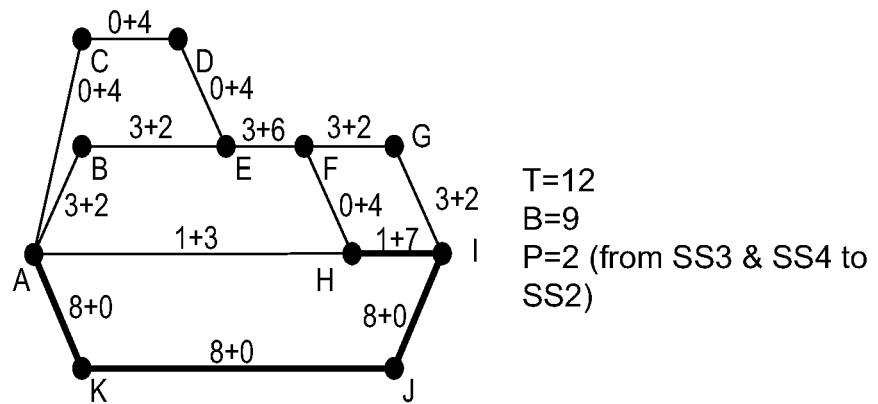
Figure 7:
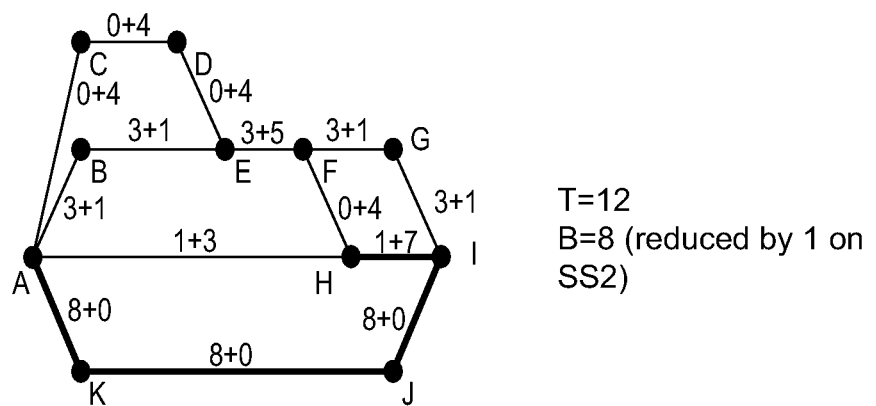

Returning to step 4, there are now four critical links: H-I; A-K; K-J; and J-I (shown in bold). In this case, 2 units of primary traffic need to be shifted from the sub-signals carried by the critical links. To do so, primary traffic needs to be shifted from two different sub-signals. Because the critical links cannot be addressed by shifting primary traffic from a single sub-signal, sub-signals 3 and 4 are selected to shift primary traffic to a link-disjoint sub-signal. In steps 6 and 7, sub-signal 2 is identified as being link-disjoint from both sub-signals 3 and 4, and is selected to receive the primary traffic shifted from sub-signals 3 and 4. In this case, only one unit of primary traffic can be shifted from each of the selected sub-signals. Thus, in step 7, one unit of primary traffic is shifted from sub-signal 3 to sub-signal 2, and one unit of primary traffic is shifted from sub-signal 4 to sub-signal 2. The traffic pattern after shifting the primary traffic is shown in FIG. 6. Because the primary traffic on the critical links is reduced by only 1 unit, the back-up traffic on the link-disjoint routes can be reduced by only 1 in step 8. The traffic pattern after reducing the backup traffic is shown in FIG. 7.

The process continues until no further shifting of primary traffic is possible or until some predetermined criterion is satisfied. For example, if link F-G allows only 4 units of backup traffic, the process stops without further iteration on sub-signals 3 and 4 even though critical links still exist.

Figure 8:
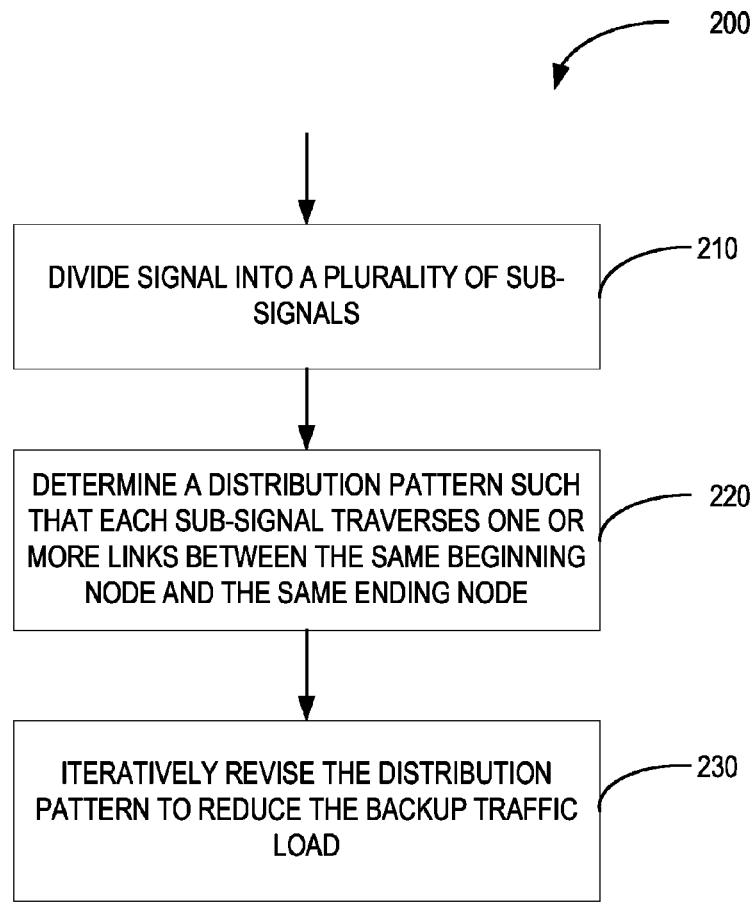
FIG. 8 illustrates a method of multi-path provisioning according to one exemplary embodiment.

FIG. 8 illustrates an exemplary method 200 for determining a traffic distribution pattern for an optical mesh network. The method begins by dividing a signal into a plurality of sub-signals (block 210) and determining a distribution pattern such that each sub-signal traverses one or more links between the same beginning node and the same ending node (block 220). The distribution pattern is then iteratively revised to reduce the back-up traffic load (block 230).

Figure 9:
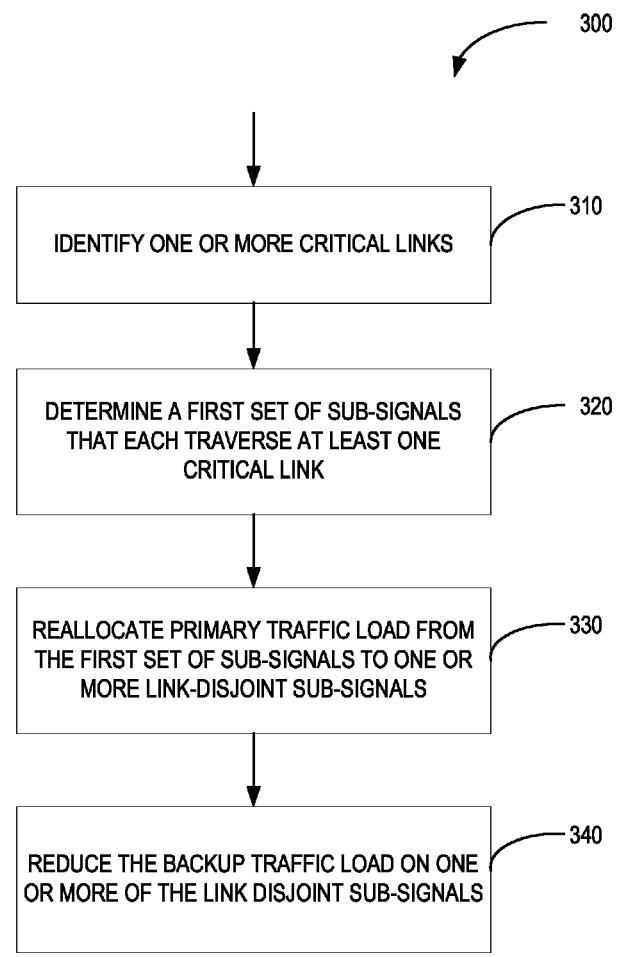
FIG. 9 illustrates an iterative optimization method used in the multi-path provisioning method.

FIG. 9 illustrates an exemplary method 300 of iteratively revising a distribution pattern to reduce the back-up traffic load in a given optical network. In each iteration, one or more critical links are identified (block 310). A first set of sub-signals that each traverse at least one critical link is then identified (block 320). The primary traffic load on the first set of sub-signals is reallocated to one or more link-disjoint sub-signals (block 330). The back-up traffic load on one or more of the link-disjoint sub-signals is then reduced (block 340). These steps (block 310-340) are repeated until no further reduction can be achieved or until some predetermined criterion are satisfied, e.g., until some predetermined number of iterations have been completed.

Figure 10:
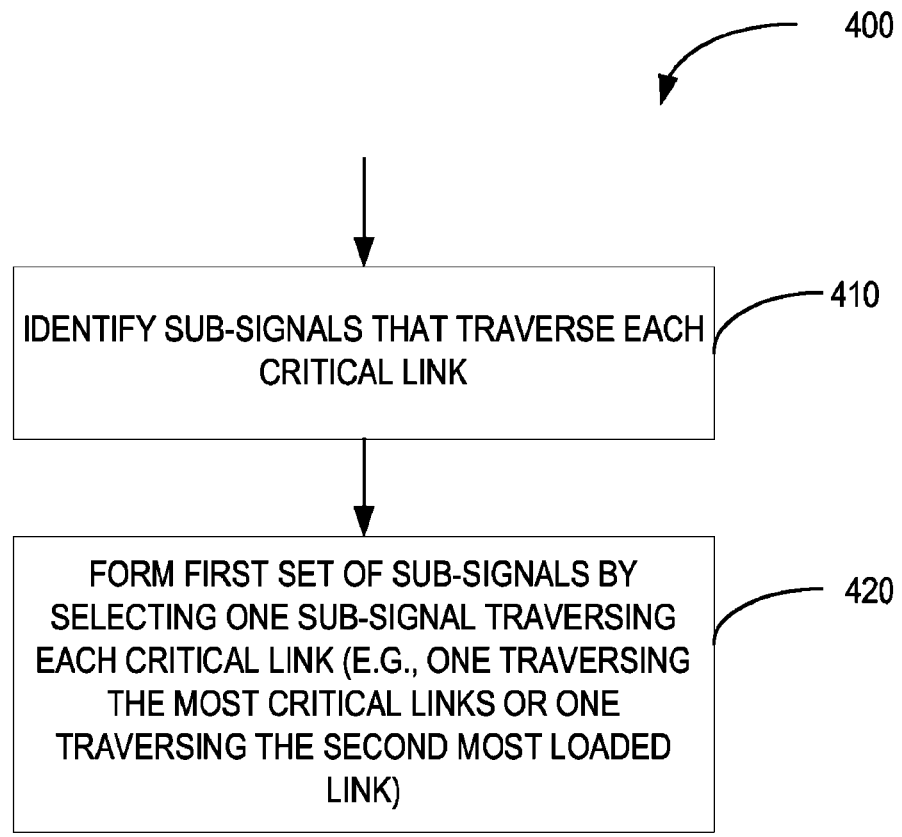
FIG. 10 illustrates an exemplary method for determining a first set of sub-signals traversing one or more crucial links.

FIG. 10 illustrates an exemplary method 400 of identifying the first set of sub-signals from which the primary traffic will be reallocated in a given optimization iteration. This method 400 may be used to perform the operations represented by block 320 in FIG. 9. After the critical links are identified, the sub-signals traversing each critical link are identified (block 410). The first set of sub-signals is formed by selecting one sub-signal traversing each critical link (block 420).

Figure 11:
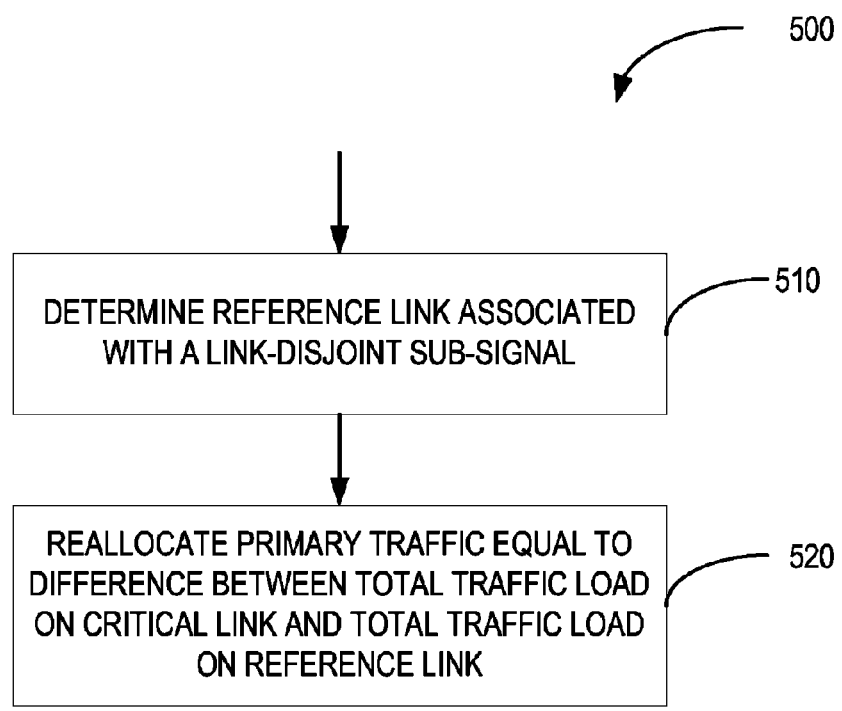
FIG. 11 illustrates an exemplary method for reallocating primary traffic from the first set of sub-signals.

FIG. 11 illustrates an exemplary method 500 for reallocating primary traffic from the first set of sub-signals to one or more link-disjoint sub-signals in an optimization iteration. This method 500 may be used to perform the operations represented by block 330 in FIG. 9. A reference link associated with a link-disjoint sub-signal is determined (block 510). In one embodiment, the selected reference link is the most heavily loaded link associated with a link-disjoint sub-signal. An amount of primary traffic equal to the difference between the total traffic load on the critical link and the total traffic load on the reference link is then reallocated (block 520). For example, in FIG. 3 the total traffic on the critical link is 12 and the total traffic on the reference link KJ is 9. In this example, 3 units of traffic were reallocated from the first set of sub-signals to the link-disjoint sub-signals.

The provisioning scheme as herein described provides an effective solution for optical layer multi-path protection that can significantly reduce resource overbuild. Additionally, the multi-path provisioning scheme as herein described does not require granular traffic.

The embodiments disclosed herein may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of determining a traffic distribution pattern in an optical network having a plurality of links, said method comprising:
   dividing, in an optical module, a signal into a plurality of sub-signals;
   determining, by a processing circuit associated with the optical module, a distribution pattern such that each sub-signal traverses one or more of said plurality of links between a same beginning node and a same ending node; and
   iteratively revising, by the processing circuit, the distribution pattern to reduce backup traffic load by:
      identifying one or more critical links in the distribution pattern;
      determining a first set of sub-signals that each traverse at least one critical link;
      reallocating a primary traffic load from the first set of sub-signals to one or more link-disjoint sub-signals, further comprising the steps of:
         determining a reference link in a link-disjoint sub-signal that has the highest traffic load; and
         reallocating a portion of the primary traffic load equal to the difference between a total traffic load on the one or more critical links and a total traffic load on the reference link; and
      reducing backup traffic on one or more of the link-disjoint sub-signals by an amount equal to the total reallocated primary traffic load.

2. The method of claim 1 wherein determining a first set of sub-signals comprises:
   identifying, for each critical link, one or more sub-signals that traverse the critical link; and
   selecting one of the identified sub-signals for each critical link.

3. The method of claim 2 wherein selecting one of the identified sub-signals for each critical link comprises selecting the sub-signal that traverses the most critical links.

4. The method of claim 2 wherein selecting one of the identified sub-signals for each critical link comprises selecting the sub-signal that traverses the second most loaded link.

5. The method of claim 2 wherein the first set of sub-signals comprises at least one sub-signal traversing two or more critical links.

6. The method of claim 2 wherein the first set of sub-signals comprises two or more sub-signals, each traversing a different critical link.

7. The method of claim 1 wherein reducing the backup traffic on one or more of the link-disjoint sub-signals comprises reducing the backup traffic load on one or more of the link-disjoint sub-signals by the maximum amount that still guarantees full recovery for a single link failure.

8. A system module for an optical network comprising one or more links, said system module comprising:
   an optical module configured to transmit and receive signals; and
   a processing module connected to said optical module and configured to:
      divide a transmitted signal into a plurality of sub-signals;
      determine a distribution pattern for the sub-signals such that each sub-signal traverses one or more of said links between the same beginning node and the same ending node; and
      iteratively revise the distribution pattern by:
         identifying one or more critical links in the distribution pattern;
         determining a first set of sub-signals, each sub-signal in said first set traversing at least one critical link;
         reallocating a primary traffic load from the first set of sub-signals to one or more link-disjoint sub-signals;
         by determining a reference link in a link-disjoint sub-signal that has the highest traffic load; and
         reallocating a portion of the primary traffic load equal to the difference between a total traffic load on the one or more critical links and a total traffic load on the reference link; and
         reducing backup traffic on one or more of the link-disjoint sub-signals an amount equal to the total reallocated primary traffic load.

9. The system module of claim 8 wherein the processing module is configured to determine a first set of sub-signals by:
   identifying, for each critical link, one or more sub-signals that traverse the critical link; and selecting one of the identified sub-signals for each critical link.

10. The system module of claim 9 wherein the processing module is further configured to select, for inclusion in the first set, one of the identified sub-signals for each critical link that traverses the most critical links.

11. The system module of claim 9 wherein the processing module is further configured to select, for inclusion in the first set, one of the identified sub-signals for each critical link that traverses the second most loaded link.

12. The system module of claim 9 wherein the first set of sub-signals comprises at least one sub-signal traversing two or more critical links.

13. The system module of claim 9 wherein the first set of sub-signals comprises two or more sub-signals, each traversing a different critical link.

\* \* \* \* \*